(12) United States Patent
Moller

(10) Patent No.: US 6,470,373 B1
(45) Date of Patent: Oct. 22, 2002

(54) SUM INTERVAL DETECTOR

(76) Inventor: Ole Henrik Moller, Molleaaparken 83 M, Lyngby DK-2800 (DK)

( * ) Notice: Subject to any disclaimer, the term of this patent is extended or adjusted under 35 U.S.C. 154(b) by 0 days.

(21) Appl. No.: 09/472,215

(22) Filed: Dec. 27, 1999

(30) Foreign Application Priority Data

Dec. 29, 1998 (DK) .......................................... 1998 01743

(51) Int. Cl.$^7$ ................................................ G06F 7/50
(52) U.S. Cl. ........................ 708/671; 708/700; 708/710; 340/146.2
(58) Field of Search .................................. 708/671, 700, 708/706, 708, 710, 207; 340/146.2

(56) References Cited

U.S. PATENT DOCUMENTS

| | | | | |
|---|---|---|---|---|
| 5,144,577 A | * | 9/1992 | Linnenberg | 708/671 |
| 5,923,579 A | * | 7/1999 | Widigen et al. | 708/706 |
| 6,292,818 B1 | * | 9/2001 | Winters | 708/671 |
| 6,341,296 B1 | * | 1/2002 | Menon | 708/671 |

OTHER PUBLICATIONS

Parhami, B. "Comments on Evaluation of A+B=K Conditions without Carry Propagation", IEEE Trans. on Computers, vol. 43, No. 4, Apr. 1994, p. 381.*
Cortadella et al, "Evaluation of A+B=K Conditions Without Carry Propagation," IEEE Trans. on Computers, vol. 41, No. 11, Nov. 1992, pp. 1484–1488.*

* cited by examiner

Primary Examiner—Tan V. Mai

(57) ABSTRACT

The sum interval detector has two n-bit inputs, a 1-bit carry input, and a 1-bit output, which is activated when the sum of the input values lies within the interval $-2^p \ldots 2^p-1$ or the like. The circuit utilizes a known method to detect whether a sum is equal to a constant to detect whether the upper n–p bits of the sum are binary 000 . . . 0, i.e. 0, or binary 111 . . . 1, i.e. −1, while the lower p bits of the sum are ignored corresponding to XXX . . . X. The method requires that the carry at position p be known which occurs with a well known, fast carry look-ahead circuit. By adding inverters and two levels of full adders the sum interval detector is capable of deciding whether two effective addresses, which each is a sum of base address plus offset, are so close, that the associated data areas overlap.

16 Claims, 5 Drawing Sheets

SUM INTERVAL DETECTOR

CROSS-REFERENCE TO RELATED APPLICATIONS

Danish patent application PA 1998 01743 entitled 'Sumintervaldetektor' filed Dec. 29, 1998.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The sum interval detector is a general arithmetic circuit that may be used to avoid conflicting memory accesses in superscalar processors. Scalar processors execute instructions in program order and the associated memory accesses will execute in the same order and no conflicts can exist between these accesses. In contrast hereto, superscalar processors may execute instructions out of order although the semantics of program order must be maintained which require many checks for dependencies both among register references and among memory references. In most cases, memory accesses may be reordered if they do not deal with the same data; but since an access is given not only by its effective address but also its size in bytes it becomes a bit more complex to detect whether two memory accesses overlap and thus may not be reordered. If all memory accesses are aligned, i.e. every effective address is a multiple of the data size, which in turn is a power of two ($2^N$), then the comparison will be a simple identity comparison that excludes the lower N bits of the effective addresses. If no alignment restriction exists no reordering may take place if the absolute difference between the two effective addresses is less than the data size.

Since effective memory addresses normally are the sum of a base address and an offset the straightforward approach would be to add the base address and offset for each effective address and then, in case of alignment restrictions, compare the effective addresses excluding the lower N bits or, without restrictions on alignment, subtract the two sums from each other and check whether the absolute difference is less than the data size, i.e. the difference lies in the interval -size ... size. In particular in the last case this is a slow process.

The special case of determining whether two effective addresses as defined above are identical corresponds to the degenerate interval 0 ... 0, i.e. the single value 0. This case has been solved in expired U.S. Pat No. 5,144,577 entitled 'Two-sum comparator'.

The present invention in part relies on a known method to detect whether a sum is equal to a constant described in 'Comments on "Evaluation of A+B=K Conditions Without Carry Propagation"' by Behrooz Parhami (IEEE Transactions on Computers, Vol. 43, No. 4, April 1994), where the goal is reduction of the negative effect of conditional jumps in pipelined processor architectures.

BRIEF SUMMARY OF THE INVENTION

The sum interval detector is a novel way of detecting whether the sum of two n-bit inputs and a carry input computed modulo $2^n$ is within the interval $-2^p \ldots 2^p-1$ without having to calculate the sum explicitly which takes both additional time and additional hardware. The word width n and the power p determining the interval may vary from implementation to implementation. The interval may be modified by only including negative values $-2^p \ldots -1$ or non-negative values $0 \ldots 2^p-1$. Further the interval may be expanded or limited by including or excluding, respectively, specific values. In particular the interval may be limited by excluding the value $-2^p$ thereby producing the symmetric interval $-2^p+1 \ldots 2^p-1$, or including the value $2^p$ thereby producing the symmetric interval $-2^p \ldots 2^p$.

Detection of whether a sum $A+B+C_0$ computed modulo $2^n$ belongs to the interval $-2^p \ldots 2^p-1$ may be split into detection of whether the sum belongs to the subinterval $-2^p \ldots -1$ or $0 \ldots 2^p-1$. The first subinterval corresponds to the binary values 111 ... 1XXX ... X, while the second subinterval corresponds to the binary values 000 ... 0XXX ... X, where n is the word width and p is the number of don't cares (X).

The invention utilizes a known method to detect whether a sum is equal to a constant to detect whether the upper n–p bit of the sum is binary 000 ... 0 or 111 ... 1, i.e. 0 or –1, respectively, while the lower p bits of the sum are ignored corresponding to XXX ... X. This requires that the carry $C_p$ be known, which occurs with a known p-bit carry look-ahead circuit CLA, which may calculate $C_p$ as follows:

$$C_p = (C_0 \text{ AND } P_0 \text{ AND} \ldots P_{p-1}) \text{ OR } (G_0 \text{ AND } P_1 \text{ AND} \ldots P_{p-1})$$
$$\text{OR} \ldots (G_{p-2} \text{ AND } P_{p-1}) \text{ OR } G_{p-1},$$

where $$G_i = A_i \text{ AND } B_i \text{ and } P_i = A_i \text{ OR } B_i.$$

The known method to detect whether a sum is equal to a constant may briefly be described as $A+B=K \Leftrightarrow$ $A+B+K^{complement} = 2^n-1 \Leftrightarrow$ $S+C = 2^n-1 \Leftrightarrow$ $S_i = C_i^{complement}$, for $i=0 \ldots n-1$, which corresponds to a reduction of $A+B+K^{complement}$ to $S+C$ (sum and carry) using carry-save addition with a number of full-adders followed by a check of whether the sum bit and the carry bit (from the previous bit position) are different in all bit positions. The carry $C_0$ is 0 in the known method but is used as a carry input in the following.

DETAILED DESCRIPTION OF THE INVENTION

Detection of whether an n-bit sum $A+B+C_0$ computed modulo $2^n$ belongs to the interval $-2^p \ldots 2^p-1$ may be split into detection of whether the sum belongs to the subinterval $-2^p \ldots -1$ or $0 \ldots 2^p-1$. The first subinterval corresponds to the binary values 111 ... 1XXX ... X, while the second subinterval corresponds to the binary values 000 ... 0XXX ... X, where n is the word width and p is the number of don't cares (X).

Figure 1:
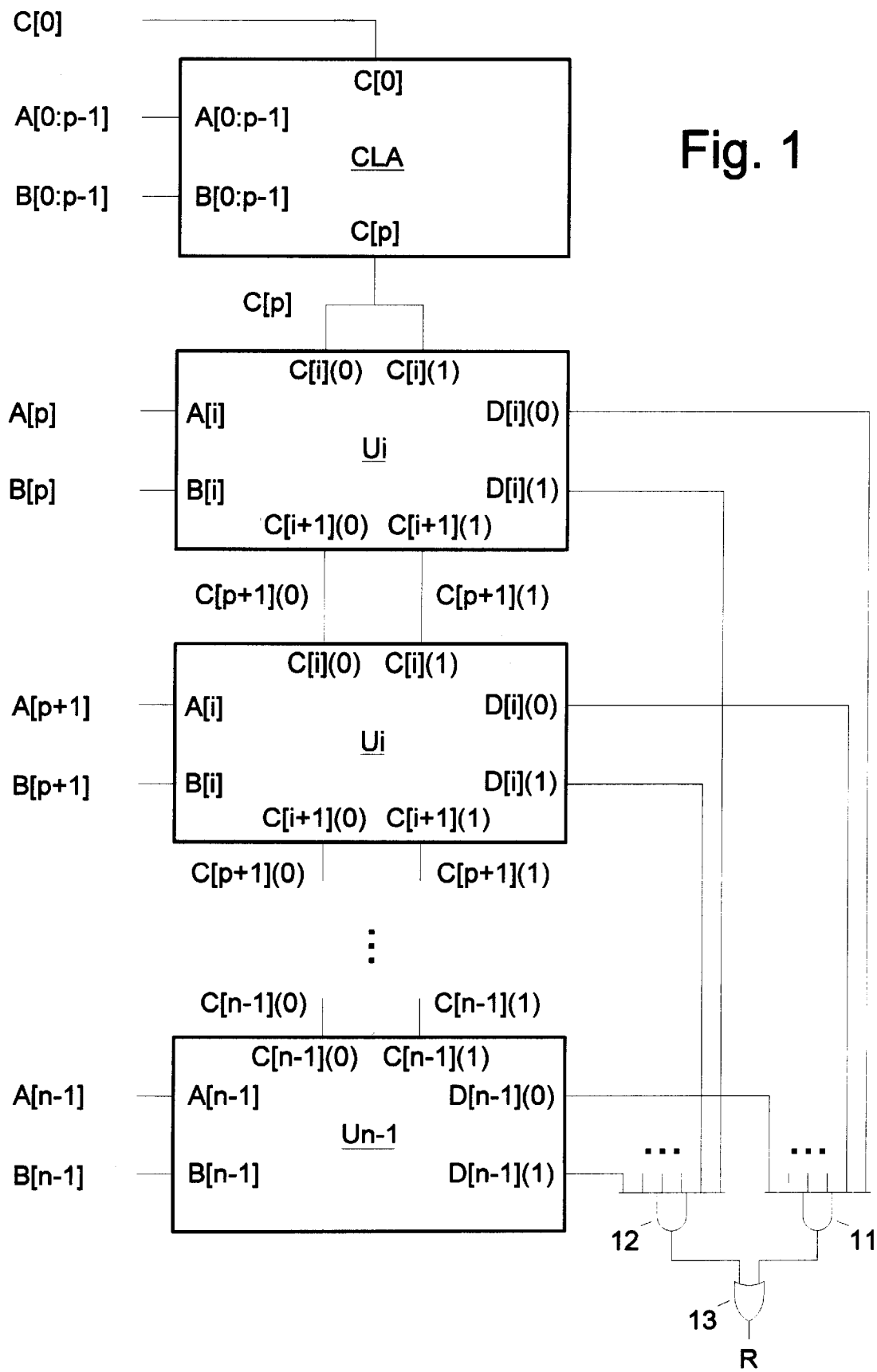
FIG. 1 shows a block diagram of the sum interval detector.

The circuit in FIG. 1 utilizes a known method to detect whether a sum is equal to a constant to detect whether the upper n–p bits of the sum is binary 000 . . . 0 or 111 . . . 1, i.e. K=0 or K=–1, respectively, while the lower p bits of the sum are ignored corresponding to XXX . . . X. The upper bits are handled by the subcircuits $U_p$, $U_{p+1}$, . . . , $U_{n-2}$, and the special subcircuit $U_{n-1}$ by receiving $A_{p\ldots n-1}$ and $B_{p\ldots n-1}$ as inputs, emitting $D_{p\ldots n-1}(0)$ and $D_{p\ldots n-1}(1)$ as outputs, while using $C_{p\ldots n-1}$ as intermediate carries. If $D_{p\ldots n-1}(0)$ are all 1 then the sum belongs in the interval $0\ldots 2^P-1$ and AND-gate (11) will output a 1. Similarly, if $D_{p\ldots n-1}(1)$ are all 1 then the sum belongs in the interval $-2^P \ldots -1$ and AND-gate (12) will output a 1. Finally, the outputs of the two AND-gates (11 and 12) are input to OR-gate (13), which produces the final result R corresponding to the interval $-2^P \ldots 2^P-1$. The method requires that the carries $C_p(0)=C_p(1)=C_p$ be known, which occurs by means of a carry look-ahead circuit CLA, which may calculate $C_p$ in the following way:

$$C_p=(C_0 \text{ AND } P_0 \text{ AND }\ldots P_{p-1}) \text{ OR } (G_0 \text{ AND } P_1 \text{ AND }\ldots P_{p-1})$$
$$\text{OR } \ldots (G_{p-2} \text{ AND } P_{p-1}) \text{ OR } G_{p-1},$$

where $$G_i = A_i \text{ AND } B_i \text{ and } P_i = A_i \text{ OR } B_i.$$

Figure 2:
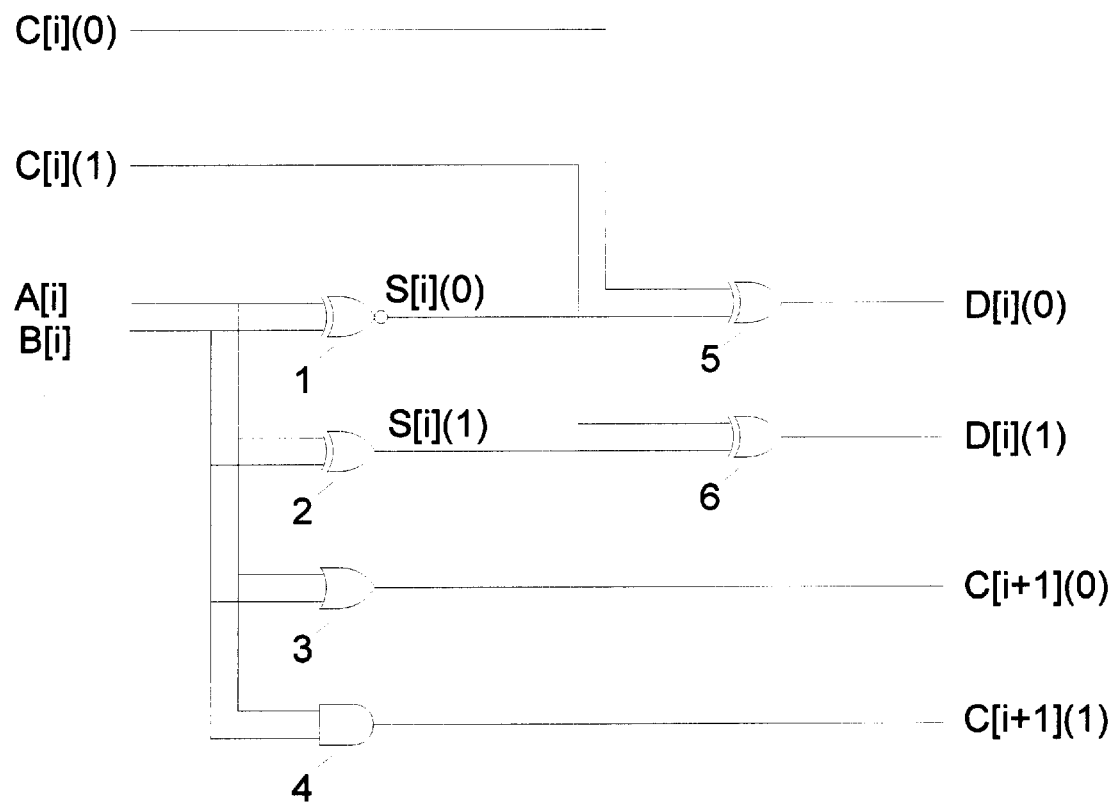
FIG. 2 shows the details of subcircuit $U_i$.

The subcircuit $U_i$ (i=p . . . n–2) in FIG. 2 shows a single bit in the known principle for detection of the relation $$A+B=K \Leftrightarrow$$
$$A+B+K^{complement} = 2^n-1 \Leftrightarrow$$
$$S+C = 2^n-1 \Leftrightarrow$$
$$S_i = C_i^{complement}, \text{ for } i=0 \ldots n-1,$$

which corresponds to a reduction of $A+B+K^{complement}$ to S+C (sum and carry) using carry-save addition with a number of full-adders followed by a check of whether the sum bit and the carry bit (from the previous bit position) are different in all bit positions. The carry-save addition may for each bit position, where $k=K_i$, be carried out using a modified half-adder, which also adds the constant 1 for k=0, since the third addend for the original full-adder here is $k^{complement}=1$, and an ordinary half-adder for k=1, since the third addend for the original full-adder here is $k^{complement}=0$. The carry-save addition uses XNOR-gate (1) and OR-gate (2) for $K_i=0$, and XOR-gate (3) and AND-gate (4) for $K_i=1$ resulting in $S_i$ and $C_{i-1}$, whereupon $S_i$ and $C_i$ are compared using XOR-gate (5) for $K_i=0$ and XOR-gate (6) for $K_i=1$.

Figure 3:
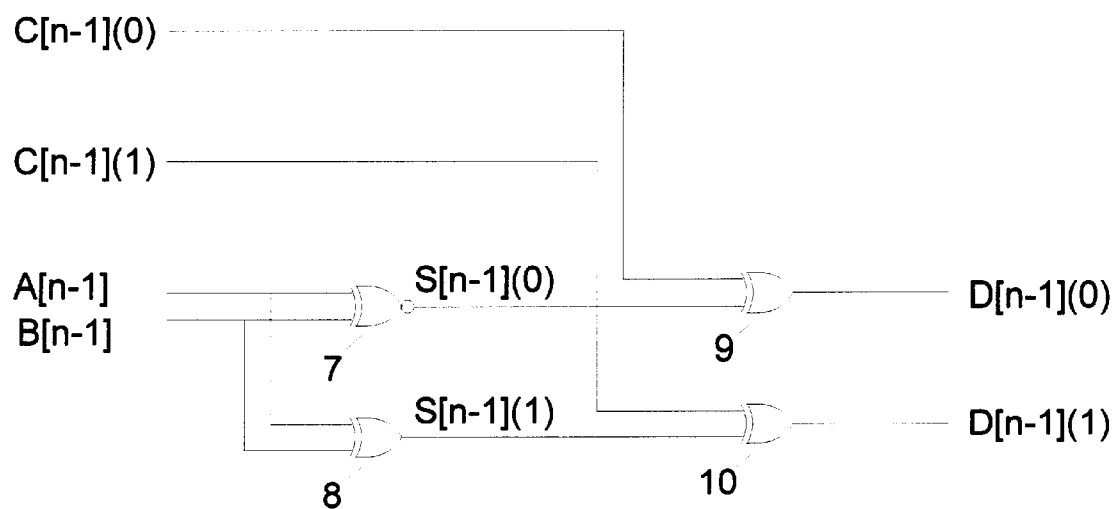
FIG. 3 shows the details of subcircuit $U_{n-1}$.

The subcircuit $U_{n-1}$ in FIG. 3 shows the same circuit for i=n–1, where the OR-gate and AND-gate above have been removed as there is no need for the output carries from bit position n–1. The remaining gates are XNOR-gate (7) and XOR-gates (8, 9, and 10).

Figure 4:
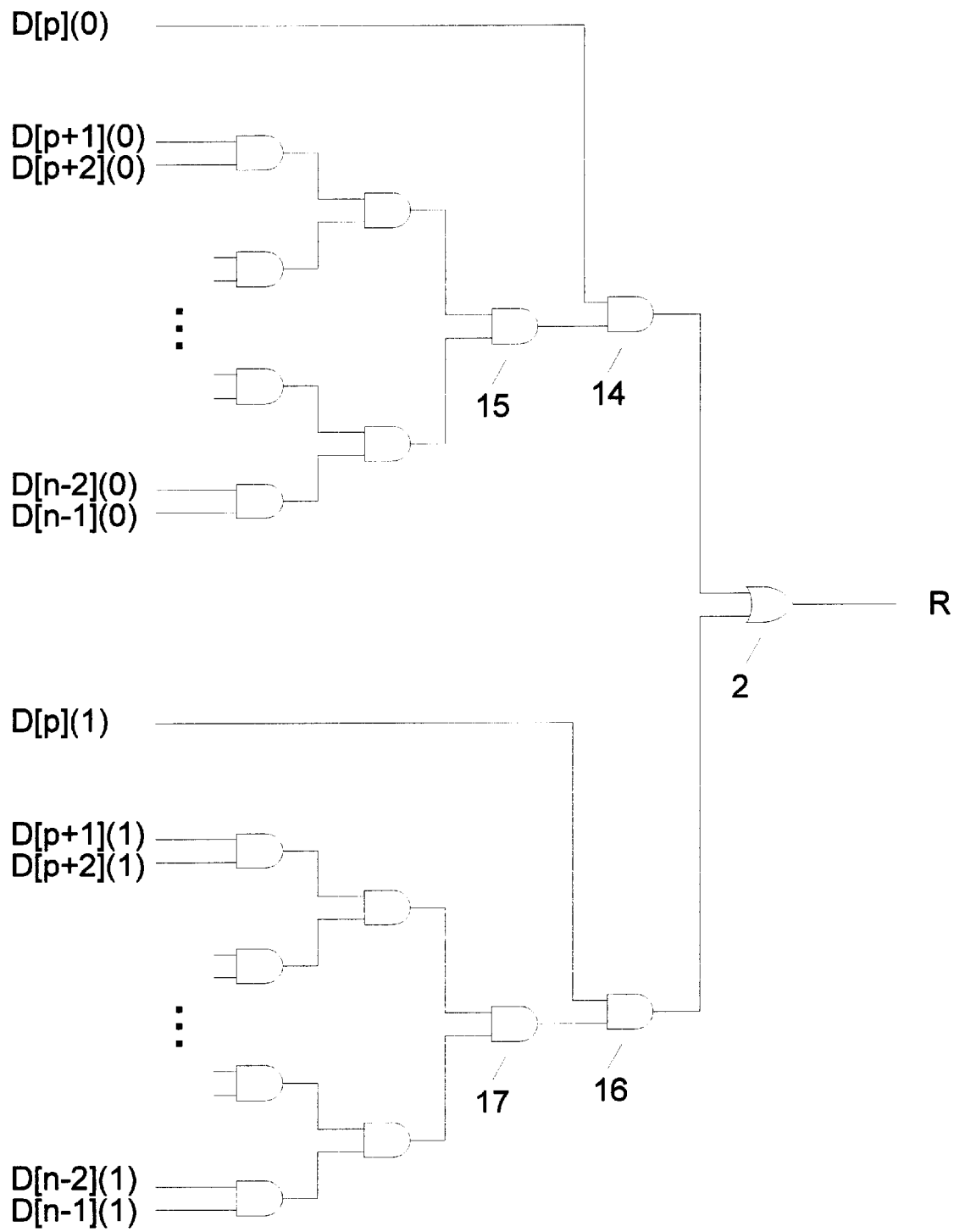
FIG. 4 shows optimized trees of AND-gates.

The circuit in FIG. 4 shows how the time delay from $D_{p\ldots n-1}(0)$ to R may be lowered by substituting the (n–p)-input AND-gate (11) by a (n–p–1)-input AND-gate implemented as a (to the extent possible) balanced tree of AND-gates, where $D_p(0)$, which is more delayed than the other inputs $D_{p+1\ldots n-1}(0)$ due to the presence of the carry look-ahead circuitry CLA, is connected to an extra AND-gate (14), whose other input comes from the AND-gate (15) at the root of the tree. Similarly, the (n–p)-input AND-gate (12) may be substituted by connecting $D_p(1)$ via AND-gate (16), whose other input comes from the AND-gate (17) at the root of the other tree that implements a (n–p–1)-input AND-gate.

In terms of logical equations the sum interval detector may be summarized as follows:

$$C_p = (A \bmod 2^p + B \bmod 2^p + C_0 >= 2^p)$$
$$S_i(0) = A_i \text{ XNOR } B_i, i=p \ldots n-1$$
$$S_i(1) = A_i \text{ XOR } B_i, i=p \ldots n-1$$
$$C_{i+1}(0) = A_i \text{ OR } B_i, i=p \ldots n-2$$
$$C_{i+1}(1) = A_i \text{ AND } B_i, i=p \ldots n-2$$
$$C_p(0) = C_p(1) = C_p$$
$$D_i(0) = S_i(0) \text{ XOR } C_i(0), i=p \ldots n-1$$
$$D_i(1) = S_i(1) \text{ XOR } C_i(1), i=p \ldots n-1$$
$$R = (D_p(0) \text{ AND } D_{p+1}(0) \text{ AND } \ldots D_{n-1}(0)) \text{ OR } (D_p(1) \text{ AND } D_{p-1}(1) \text{ AND } \ldots D_{n-1}(1))$$

In mathematical terms the condition for activating the output R can thus be expressed as follows:

$$-2^P <= A+B+C_0 <= 2^P-1 \Leftrightarrow$$
$$-2^P <= (A \text{ div } 2^p + B \text{ div } 2^p)*2^p + (A \bmod 2^p + B \bmod 2^p + C_0 \bmod 2^p) <= 2^P-1 \Leftrightarrow$$
$$-2^P <= (A \text{ div } 2^p + B \text{ div } 2^p + C_p)*2^p <= 2^P-1 \Leftrightarrow$$
$$-1 <= A \text{ div } 2^p + B \text{ div } 2^p + C_p < 1 \Leftrightarrow$$
$$\text{OR } (A \text{ div } 2^p + B \text{ div } 2^p + C_p = K), K=-1, 0 \Leftrightarrow$$
$$\text{OR } (A \text{ div } 2^p + B \text{ div } 2^p + C_p + K^{complement} = -1), K=-1, 0 \Leftrightarrow$$
$$\text{OR } (S(K)_{p\ldots n-1} + C(K)_{p\ldots n-1} = -1), K=-1, 0 \Leftrightarrow$$
$$\text{OR } (S(K)_{p\ldots n-1} = C(K)^{complement}_{p\ldots n-1}), K=-1, 0 \Leftrightarrow$$
$$\text{OR } (\text{AND}(S(K_i) = C(K_{i-1})^{complement}), i=p \ldots n-1), K=-1, 0 \Leftrightarrow$$
$$\text{OR } (\text{AND}(S(K_i) \text{ XOR } C(K_{i-1}))), i=p \ldots n-1), K=-1, 0 \Leftrightarrow$$
$$\text{OR } (\text{AND}(D(K_i)), i=p \ldots n-1), K=-1, 0 \Leftrightarrow$$

Here the operators div and mod are defined as in the programming language Modula-3: $x \text{ div } y = \lfloor x/y \rfloor$ and $x \bmod y = x - (x \text{ div } y)*y >= 0$. For n-bit binary numbers $x \text{ div } 2^p$ correspond to the n–p upper bits of x and $x \bmod 2^p$ to the lower p bits of x. All additions ignore a carry out of the most significant bit.

Figure 5:
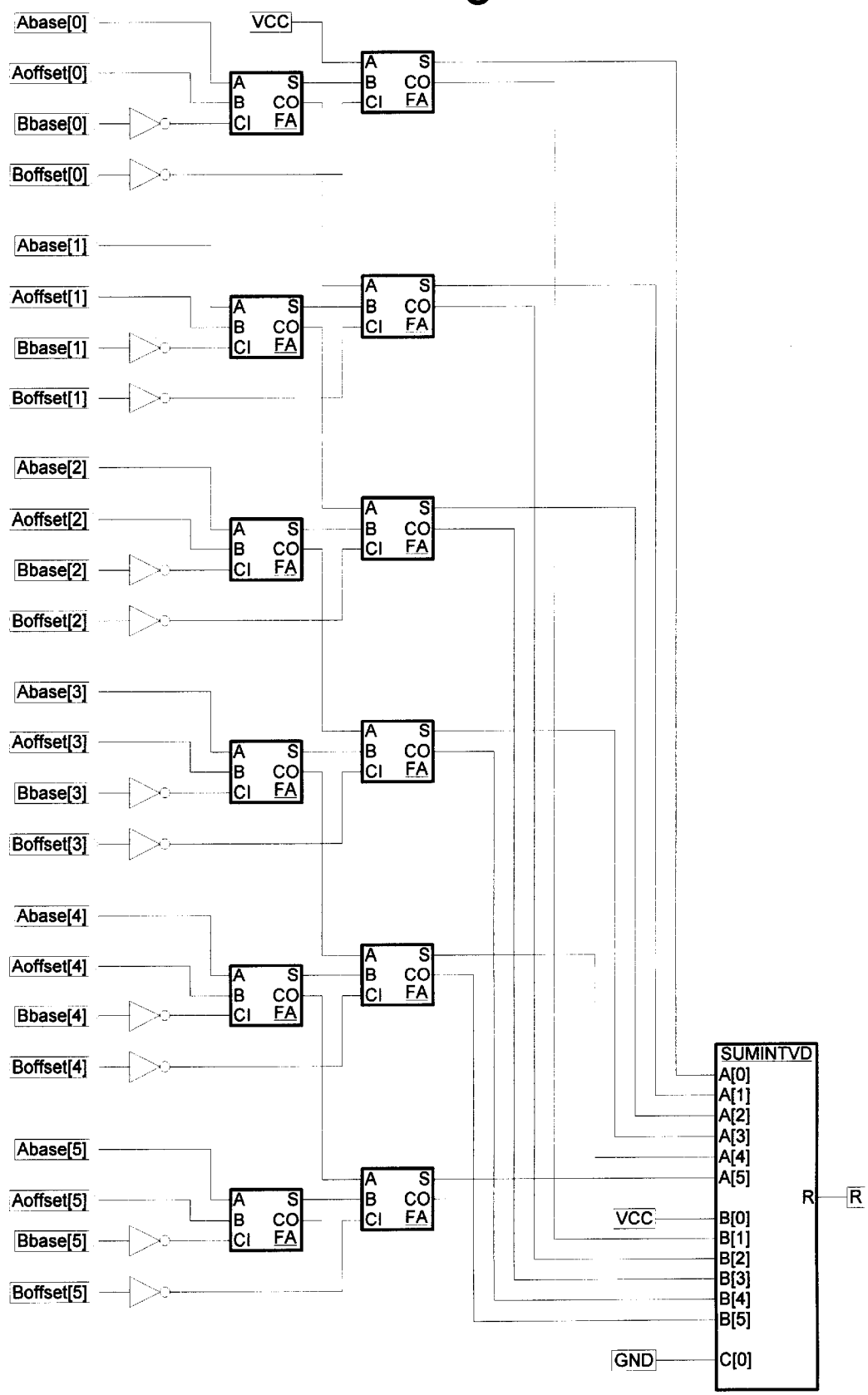
FIG. 5 shows the interval detector for two effective addresses each consisting of base plus offset (for n=6).

The circuit in FIG. 5 shows, how the sum interval detector (for n=6) may be used to find out whether two effective addresses A and B, which each are the sum of a base address and an address offset, are so close that each address data area each occupying $2^p$ bytes, overlap or lie back-to-back in a specific order. This corresponds to the difference between the two effective addresses be in the interval $-2^p \ldots 2^p-1$. At the left of the figure is shown the inputs Abase[5:0], Aoffset[5:0], Bbase[5:0], and Boffset[5:0], followed by inverters, which complements the two latter inputs, such that the two following levels of carry-save adders (implemented with full-adders (FA) with 1-bit inputs A, B, and CI (carry-in) and 1-bit outputs S (sum) and CO (carry-out)) reduce (Abase[5:0]+Aoffset[5:0])–(Bbase[5:0]30 Boffset[5:0])= Abase[5:0]+Aoffset[5:0]+Bbase[5:0]$^{complement}$+1+Boffset [5:0]$^{complement}$+1 to a carry-save sum A[5:0]+B[5:0], which is then presented to the sum interval detector at the right. The first 1 (VCC) is added in the second level of carry-save addition, the second 1 (VCC) is added at the $B_0$ input to the sum interval detector, while the carry input $C_0$ to the sum interval detector is set to 0 (GND).

Detection of whether an n-bit sum $A+B+C_0$ computed modulo $2^n$ belongs to the symmetric interval $-2^P+1 \ldots 2^P-1$ can be handled by detecting whether the sum belongs to the asymmetric interval $-2^P+1 \ldots 2^P-1$ and then excluding the case where the sum is equal to the single value $-2^P+1$. This value may be detected by using the known method to detect whether a sum is equal to a constant. The logical result of this detection must be complemented and then added as an extra input to AND-gate (12) in FIG. 1. The circuitry for detecting this single value and the asymmetric interval have some common circuitry for bits p+1 ... n−1 which may be shared.

Similarly, detection of whether an n-bit sum $A+B+C_0$ computed modulo $2^n$ belongs to the symmetric interval $-2^p \ldots 2^p$ can be handled by detecting whether the sum belongs to the asymmetric interval $-2^p \ldots 2^p-1$ and then adding the case where the sum is equal to the single value $-2^p$. This value may be detected by using the known method to detect whether a sum is equal to a constant. The logical result of this detection must then be added as an extra input to OR-gate (13) in FIG. 1. The circuitry for detecting this single value and the asymmetric interval have some common circuitry for bits p+2... n−1 which may be shared.

The critical time delay through the sum interval detector may be minimized through circuit design and simple logical transformations including application of De Morgans theorem, negation of both an input and the output of XOR-gates, and replacement of gates with many inputs with trees of gates, without any change to the logical function of the circuit. In particular may an AND-OR-gate be replaced by a NAND-NAND-gate, and an n-input AND-gate may be replaced by a tree of alternating levels of NAND-gates and NOR-gates.

I claim:

1. A sum interval detector characterized by an n-bit input $A_{0 \ldots n-1}$, an n-bit input $B_{0 \ldots n-1}$, a 1-bit carry input $C_0$, where bit position 0 is the least significant bit position, and a 1-bit output R, where the latter indicates whether the n-bit sum $A+B+C_0$ computed modulo $2^n$ is included in the interval $-2^p \ldots 2^p-1$, said sum interval detector comprising:

a p-bit fast, known carry look-ahead circuit CLA with a p-bit input $A_{0 \ldots p-1}$, a p-bit input $B_{0 \ldots p-1}$, a 1-bit carry input $C_0$, and a 1-bit carry output $C_p$, (n−p−1) identical subcircuits $U_p, U_{p+1}, \ldots, U_{n-2}$, each with a 1-bit input $A_i$, a 1-bit input $B_i$, a 1-bit carry input $C_i(0)$, a 1-bit carry input $C_i(1)$, output $D_i(0)$, and output $D_i(1)$, a 1-bit carry output $C_{i+1}(0)$, and a 1-bit carry output $C_{i+1}(1)$, output $D_{n-1}(0)$, and output $D_{n-1}(1)$, a subcircuit $U_{n-1}$ with a 1-bit input $A_{n-1}$, a 1-bit input $B_{n-1}$, a 1-bit carry input $C_{n-1}(0)$, and 1-bit carry input $C_{n-1}(1)$, a first (n−p)-input AND-gate, a second (n−p)-input AND-gate, and a first 2-input OR-gate assembled such that the n-bit input $A_{0 \ldots n-1}$ of the sum interval detector is split into $A_{0 \ldots p-1}, A_p \ldots n-2, A_{n-1}$ and connected to the p-bit input $A_{0 \ldots p-1}$ of CLA, the (n−p−1) 1-bit inputs $A_i$ of subcircuits $U_p, U_{p-1}, \ldots, U_{n-2}$, and the 1-bit input $A_{n-1}$ of subcircuit $U_{n-1}$, respectively, the n-bit input $B_{0 \ldots n-1}$ of the sum interval detector is split into $B_{0 \ldots p-1}, B_p \ldots n-2, B_{n-1}$ and connected to the p-bit input $B_{p \ldots n-1}$ of CLA, the (n−p−1) 1-bit inputs $B_i$ of subcircuits $U_p, U_{p-1}, \ldots, U_{n-2}$, and the 1-bit input $B_{n-1}$ of subcircuit $U_{n-1}$, respectively, the 1-bit carry input of the sum interval detector is connected to the 1-bit carry input $C_0$ of CLA, the 1-bit carry output $C_p$ of CLA is connected to both 1-bit carry inputs $C_p(0)$ and $C_p(1)$ of subcircuit $U_p$, the 1-bit carry outputs $C_{i+1}(0)$ of subcircuits $U_p, U_{p-1}, \ldots, U_{n-2}$ are connected to the 1-bit carry inputs $C_i(0)$ of subcircuits $U_{p+1}, U_{p+2}, \ldots, U_{n-1}$, respectively, the 1-bit carry outputs $C_{i-1}(1)$ of subcircuits $U_p, U_{p-1}, \ldots, U_{n-2}$ are connected to the 1-bit carry inputs $C_i(1)$ of subcircuits $U_{p+1}, U_{p+2}, \ldots, U_{n-1}$, respectively, the (n−p) 1-bit outputs $D_i(0)$ of subcircuits $U_p, U_{p+1}, \ldots, U_{n-1}$ are connected to the (n−p) inputs of first (n−p)-input AND-gate, the (n−p) 1-bit outputs $D_i(1)$ of subcircuits $U_p, U_{p+1}, \ldots, U_{n-1}$ are connected to the (n−p) inputs of second (n−p)-input AND-gate, the 1-bit output of first (n−p)-input AND-gate and the 1-bit output of second (n−p)-input AND-gate are connected to first 2-input OR-gate, the output of first 2-input OR-gate is connected to the output R of the sum interval detector, where each subcircuit $U_p, U_{p+1}, \ldots, U_{n-2}$ consists of a first 2-input XNOR-gate, a first 2-input XOR-gate, a second 2-input OR-gate, a first 2-input AND-gate, a second 2-input XOR-gate, and a third 2-input XOR-gate, assembled such that the 1-bit input $A_i$ and 1-bit input $B_i$ of subcircuit $U_i$ are connected in parallel to the inputs of the first 2-input XNOR-gate, the first 2-input XOR-gate, the second 2-input OR-gate, and the first 2-input AND-gate, the 1-bit output of first 2-input XNOR-gate via signal $S_i(0)$ and the 1-bit input carry input $C_i(0)$ of subcircuit $U_i$ are connected to the inputs of the second 2-input XOR-gate, whose output is connected to 1-bit output $D_i(0)$ of subcircuit $U_i$, the 1-bit output of first 2-input XOR-gate via signal $S_i(1)$ and the 1-bit input carry input $C_i(1)$ of subcircuit $U_i$ are connected to third 2-input XOR-gate, whose output is connected to 1-bit output $D_i(1)$ of subcircuit $U_i$, the output of the second 2-input OR-gate is connected to the 1-bit carry output $C_{i+1}(0)$ of subcircuit $U_i$, and the output of the first 2-input AND-gate is connected to the 1-bit carry output $C_{i+1}(1)$ of subcircuit $U_i$, while the subcircuit $U_{n-1}$ consists of a second 2-input XNOR-gate, a fourth 2-input XOR-gate, a fifth 2-input XOR-gate, and a sixth 2-input XOR-gate, assembled such that the 1-bit input $A_{n-1}$ and 1-bit input $B_{n-1}$ of subcircuit $U_{n-1}$ are connected in parallel to the inputs of the second 2-input XNOR-gate, and the fourth 2-input XOR-gate, the 1-bit output of second 2-input XNOR-gate via signal $S_{n-1}(0)$ and the 1-bit input carry input $C_{n-1}(0)$ of subcircuit $U_{n-1}$ are connected to fifth 2-input XOR-gate, whose output is connected to 1-bit output $D_{nm-1}(0)$ of subcircuit $U_{n-1}$, the 1-bit output of fourth 2-input XOR-gate via signal $S_{n-1}(1)$ and the 1-bit input carry input $C_{n-1}(1)$ of subcircuit $U_{n-1}$ are connected to sixth 2-input XOR-gate, whose output is connected to 1-bit output $D_{n-1}(1)$ of subcircuit $U_{n-1}$.

2. The invention according to claim 1 characterized by minimization of the time delay of the time critical paths from $D_p(0)$ and $D_p(1)$ of subcircuit $U_p$ to the output R by substituting first (n−p)-input AND-gate with a first (n−p−1)-input AND-gate and a second 2-input AND-gate such that first (n−p−1)-input AND-gate receives all the inputs of first (n−p)-input AND-gate except signal $D_p(0)$, and connecting this signal and the output of first (n−p−1)-input AND-gate to second 2-input AND-gate whose output replaces the output of first (n−p−1)-input AND-gate, and substituting second (n−p)-input AND-gate with a second (n−p−1)-input AND-gate and a third 2-input AND-gate such that second (n−p−1)-input AND-gate receives all the inputs of second (n−p)-input AND-gate except signal $D_p(1)$, and connecting this signal and the output of second (n−p−1)-input AND-gate to third 2-input AND-gate whose output replaces the output of second (n−p−1)-input AND-gate.

3. The invention according to claim 2 characterized by minimization of the time delay of the time critical paths from $D_{p-1}(0), D_{p+2}(0), \ldots, D_{n-1}(0)$ and $D_{p+1}(1), D_{p+2}(1), \ldots, D_{n-1}(1)$ from subcircuits $U_{p+1}, U_{p+2}, \ldots, U_{n-1}$, respectively, to the output R by substituting first (n−p−1)-input AND-gate with a faster first tree of hierarchical connected AND-gates with fewer inputs, and substituting second (n−p−1)-input AND-gate with a faster second tree of hierarchical connected AND-gates with fewer inputs.

4. The invention according to claim 1 characterized by an additional 1-bit output $R^+$, which indicate that the n-bit sum $A+B+C_0$ computed modulo $2^n$ is included in the interval $0 \ldots 2^p-1$, connected to the output of first (n−p)-input AND-gate, and an additional 1-bit output $R^-$, which indicate that the n-bit sum $A+B+C_0$ computed modulo $2^n$ is included in the interval $-2^p \ldots -1$, connected to the output of second (n−p)-input AND-gate.

5. The invention according to claim 2 or 3 characterized by an additional 1-bit output $R^+$, which indicate that the n-bit sum $A+B+C_0$ computed modulo $2^n$ is included in the interval $0 \ldots 2^p-1$, connected to the output of second 2-input AND-gate, and an additional 1-bit output $R^-$, which indicate that the n-bit sum $A+B+C_0$ computed modulo $2^n$ is included in the interval $-2^p \ldots -1$, connected to the output of third 2-input AND-gate.

6. The invention according to claim 1 characterized by an adjustment of the asymmetric interval $-2^p \ldots 2^p-1$, to include the single value $2^p$ corresponding to the symmetric interval $-2^p \ldots 2^p$ by widening the first 2-input OR-gate to a 3-input OR-gate with an extra input connected to the output of a known circuit capable of detecting whether the n-bit sum $A+B+C_0$ computed modulo $2^n$ is equal to $2^p$, or exclude the single value $-2^p$ corresponding to the symmetric interval $-2^p+1 \ldots 2^p-1$ by widening the second (n−p)-input AND-gate to an (n−p+1)-input AND-gate with the extra input connected to the inverted output of a known circuit capable of detecting whether the n-bit sum $A+B+C_0$ computed modulo $2^n$ is equal to $-2^p$.

7. The invention according to claim 2 or 3 characterized by an adjustment of the asymmetric interval $-2^p \ldots 2^p-1$ to include the single value $2^p$ corresponding to the symmetric interval $-2^p \ldots 2^p$ by widening the first 2-input OR-gate to a 3-input OR-gate with an extra input connected to the output of a known circuit capable of detecting whether the n-bit sum $A+B+C_0$ computed modulo $2^n$ is equal to $2^p$, or exclude the single value $-2^p$ corresponding to the symmetric interval $-2^p+1 \ldots 2^p-1$ by widening the third 2-input AND-gate to a 3-input AND-gate with the extra input connected to the inverted output of a known circuit capable of detecting whether the n-bit sum $A+B+C_0$ computed modulo $2^n$ is equal to $-2^p$.

8. A sum interval detector characterized by an n-bit input $A_{0 \ldots n-1}$, an n-bit input $B_{0 \ldots n-1}$, a 1-bit carry input $C_0$, where bit position 0 is the least significant bit position, and a 1-bit output R, where the latter indicates whether the n-bit sum $A+B+C_0$ computed modulo $2^n$ is included in the interval $-2^p \ldots 2^p-1$, said sum interval detector defined by the following logic equations:

$C_p$=carry output from a known carry look-ahead circuit
$\quad$ CLA($A_{0 \ldots p-1}, B_{0 \ldots p-1}, C_0$)

$S_i(0) = A_i$ XNOR $B_i$, $i=p \ldots n-1$ $S_i(1) = A_i$ XOR $B_i$, $i=p \ldots n-1$ $C_{i+1}(0) = A_i$ OR $B_i$, $i=p \ldots n-2$ $C_{i+1}(1) = A_i$ AND $B_i$, $i=p \ldots n-2$ $C_p(0) = C_p(1) = C_p$ $D_i(0) = S_i(0)$ XOR $C_i(0)$, $i=p \ldots n-1$ $D_i(1) = S_i(1)$ XOR $C_i(1)$, $i=p \ldots n-1$ $R = (D_p(0)$ AND $D_{p+1}(0)$ AND $\ldots D_{n-1}(0))$ OR $(D_p(1)$ AND $D_{p+1}(1)$ AND $\ldots D_{n-1}(1))$.

9. The invention according to claim 8 characterized by minimization of the time delay of the time critical paths from $D_p(0)$ and $D_p(1)$ of subcircuit $U_p$ to the output R by using separate 2-input AND-gates as indicated by the associating in the equation $R = (D_p(0)$ AND $(D_{p+1}(0)$ AND $\ldots D_{n-1}(0)))$ OR $(D_p(1)$ AND $D_{p+1}(1)$ AND $\ldots D_{n-1}(1)))$.

10. The invention according to claim 9 characterized by minimization of the time delay of the time critical paths from $D_{p+1}(0), D_{p+2}(0), \ldots, D_{n-1}(0)$ and $D_{p+1}(1), D_{p+2}(1), \ldots, D_{n-1}(1)$ from subcircuits $U_{p+1}, U_{p-2}, \ldots, U_{n-1}$, respectively, to the output R by using two faster trees of hierarchical connected AND-gates with fewer inputs as indicated by the further associating in the equation $R = (D_p(0)$ AND $((D_{p+1}(0)$ AND $\ldots D_v(0))$ AND $(D_{v-1}(0)$ AND $\ldots D_w(0))$ AND $\ldots (D_{z+1}(0)$ AND $\ldots D_{n-1}(0))))$ OR $(D_p(1)$ AND $((D_{p-1}(1)$ AND $\ldots D_v(1))$ AND $(D_{v+1}(1)$ AND $\ldots D_w(1))$ AND $(D_{w+1}(1)$ AND $\ldots (D_{z+1}(1)$ AND $\ldots D_{n-1}(1))))$, where $v<w< \ldots <z$.

11. The invention according to claim 10 characterized by additional 1-bit outputs $R^+$ and $R^-$, which indicate whether the n-bit sum $A+B+C_0$ computed modulo $2^n$ is included in the interval $0 \ldots 2^p-1$ or $-2^p \ldots -1$, respectively, as indicated by the equations $R^+ = (D_p(0)$ AND $((D_{p+1}(0)$ AND $\ldots D_v(0))$ AND $(D_{v+1}(0)$ AND $\ldots D_w(0))$ AND $\ldots (D_{z+1}(0)$ AND $\ldots D_{n-1}(0))))$, $R^- = (D_p(1)$ AND $((D_{p+1}(1)$ AND $\ldots D_v(1))$ AND $(D_{v+1}(1)$ AND $\ldots D_w(1))$ AND $\ldots (D_{z+1}(1)$ AND $\ldots D_{n-1}(1))))$, where $p<w< \ldots <z<n-1$.

12. The invention according to claim 10 characterized by an adjustment of the asymmetric interval $-2^p \ldots 2^p-1$ to include the single value $2^p$ corresponding to the symmetric interval $-2^p \ldots 2^p$ by adding a logic term determined by a known circuit to the logic expression for R, thus obtaining $R' = (D_p(0)$ AND $((D_{p+1}(0)$ AND $\ldots D_v(0))$ AND $(D_{v+1}(0)$ AND $\ldots D_w(0))$ AND $\ldots (D_{w-1}(0)$ AND $\ldots D_z(0))$ AND $(D_{z+1}(0)$ AND $\ldots D_{n-1}(0))))$ OR $(D_p(1)$ AND $((D_{p+1}(1)$ AND ... $D_v(1))$ AND $(D_{v-1}(1)$ AND ... $D_w(1))$ AND ... $(D_{w+1}(1)$ AND ... $D_z(1))$ AND $(D_{z+1}(1)$ AND ... $D_{n-1}(1))))$ OR (n-bit sum $A+B+C_0$ computed modulo $2^n$ is equal to $2^p$), where v<w< ... <z, or exclude the single value $-2^p$ corresponding to the symmetric interval $-2^p+1$ ... $2^p-1$ by adding an inverted logic factor determined by a known circuit to the part of the logic expression for R that deals with the negative subinterval, thus obtaining $R''=(D_p(0)$ AND $((D_{p-1}(0)$ AND ... $D_v(0))$ AND $(D_{v-1}(0)$ AND ... $D_w(0))$ AND $(D_{w+1}(0)$ AND ... $D_z(0))$ AND $(D_{z+1}(0)$ AND ... $D_{n-1}(0))))$ OR $(D_p(1)$ AND $((D_{p+1}(1)$ AND ... $D_v(1))$ AND $(D_{v+1}(1)$ AND ... $D_w(1))$ AND ... $(D_{w+1}(1)$ AND ... $D_z(1))$ AND $(D_{z+1}(1)$ AND ... $D_{n-1}(1)))$ ) AND NOT (n-bit sum $A+B+C_0$ computed modulo $2^n$ is equal to $2^p$)), where v<w< ... <z.

13. The invention according to claim 9 characterized by additional 1-bit outputs $R^+$ and $R^-$, which indicate whether the n-bit sum $A+B+C_0$ computed modulo $2^n$ is included in the interval 0 ... $2^p-1$ or $-2^p$ ... $-1$, respectively, as indicated by the equations $R^+=D_p(0)$ AND $(D_{p+1}(0)$ AND ... $D_{n-1}(0))$, $R^-=D_p(1)$ AND $(D_{p+1}(1)$ AND ... $D_{n-1}(1))$.

14. The invention according to claim 9 characterized by an adjustment of the asymmetric interval $-2^p$ ... $2^p-1$ to include the single value $2^p$ corresponding to the symmetric interval $-2^p$ ... $2^p$ by adding a logic term determined by a known circuit to the logic expression for R, thus obtaining $R'=(D_p(0)$ AND $(D_{p+1}(0)$ AND ... $D_{n-1}(0)))$ OR $(D_p(1)$ AND $(D_{p-1}(1)$ AND ... $D_{n-1}(1)))$ OR (n-bit sum $A+B+C_0$ computed modulo $2^n$ is equal to $2^p$), or exclude the single value $-2^p$ corresponding to the symmetric interval $-2^p+1$ ... $2^p-1$ by adding an inverted logic factor determined by a known circuit to the part of the logic expression for R that deals with the negative subinterval, thus obtaining $R''=(D_p(0)$ AND $(D_{p+1}(0)$ AND ... $D_{n-1}(0)))$ OR $(D_p(1)$ AND $(D_{p+1}(1)$ AND ... NOT (n-bit sum $A+B+C_0$ computed modulo $2^n$ is equal to $2^p$)).

15. The invention according to claim 8 characterized by additional 1-bit outputs $R^+$ and $R^-$, which indicate whether the n-bit sum $A+B+C_0$ computed modulo $2^n$ is included in the interval 0 ... $2^p-1$ or $-2^p$ ... $-1$, respectively, as indicated by the equations $R^+=D_p(0)$ AND $D_{p-1}(0)$ AND ... $D_{n-1}(0)$, $R^-=D_p(1)$ AND $D_{p+1}(1)$ AND ... $D_{n-1}(1)$.

16. The invention according to claim 8 characterized by an adjustment of the asymmetric interval $-2^p$ ... $2^p-1$ to include the single value $2^p$ corresponding to the symmetric interval $-2^p$ ... $2^p$ by adding a logic term determined by a known circuit to the logic expression for R, thus obtaining $R'=(D_p(0)$ AND $D_{p-1}(0)$ AND ... $D_{n-1}(0))$ OR $(D_p(1)$ AND $D_{p+1}(1)$ AND ... $D_{n-1}(1))$ OR (n-bit sum $A+B+C_0$ computed modulo $2^n$ is equal to $2^p$), or exclude the single value $-2^p$ corresponding to the symmetric interval $-2^p+1$ ... $2^p-1$ by adding an inverted logic factor determined by a known circuit to the part of the logic expression for R that deals with the negative subinterval, thus obtaining $R''=(D_p(0)$ AND $D_{p+1}(0)$ AND ... $D_{n-1}$ $(0)))$ OR $(D_p(1)$ AND $D_{p+1}(1)$ AND ...

$D_{n-1}(1)$ AND

NOT (n-bit sum $A+B+C_0$ computed modulo $2^n$ is equal to $2^p$)).

* * * * *